(12) United States Patent
Ohkubo

(10) Patent No.: US 6,581,489 B2
(45) Date of Patent: Jun. 24, 2003

(54) BALL SCREW

(75) Inventor: Tsutomu Ohkubo, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/013,462

(22) Filed: Dec. 13, 2001

(65) Prior Publication Data

US 2002/0073794 A1 Jun. 20, 2002

(30) Foreign Application Priority Data

Dec. 14, 2000 (JP) ......................................... 2000-380075

(51) Int. Cl.⁷ ............................................... F16H 25/22
(52) U.S. Cl. ................................................. 74/424.86
(58) Field of Search .................. 74/424.82, 424.86; 384/45

(56) References Cited

U.S. PATENT DOCUMENTS 5,809,838 A * 9/1998 Miyaguchi et al. ............ 74/459
6,282,972 B2 * 9/2001 Kuramochi et al. ........... 74/459
6,347,558 B1 * 2/2002 Miyaguchi et al. ..... 74/424.8 R

* cited by examiner

Primary Examiner—Chris Schwartz
(74) Attorney, Agent, or Firm—Sughrue Mion, PLLC

(57) ABSTRACT

The ball scooping position of a ball is setted downwardly of a reference line and the angle of the ball scooping position with respect to the reference line is setted at an angle of −15°. The end face of the rising portion of a tube is disposed so as to coincide with the reference line. The axis of the rising portion is setted so as to be present outside of a line corresponding to the ball center locus of a raceway. The inner surface of the pickup portion of the tube is connected with the ball scooping position of the ball rolling groove of a nut by a surface which exists outside of the ball rolling groove of the nut.

6 Claims, 3 Drawing Sheets

CONVENTIONAL

BALL SCREW

BACKGROUND OF THE PRESENT INVENTION

The present invention relates to a ball screw.

A ball screw is a linear guide apparatus which is composed of a screw shaft, a nut and a plurality of balls. In the outer peripheral surface of the screw shaft and in the inner peripheral surface of the nut, there are formed spiral-shaped ball rolling grooves. These two spiral-shaped ball rolling grooves cooperate together and define a raceway along which the balls are allowed to roll. In case that the balls roll on the raceway while being loaded, the nut moves linearly with respect to the axis of the screw shaft. That is, the spiral-shaped ball rolling grooves of the screw shaft and the nut provide a ball rolling raceway. Also, in the case of a ball screw of a tube type using a tube-shaped ball circulating passage, there is disposed a tube which allows the balls to circulate from one end side of the raceway to the other end side thereof.

FIG. 3 is a partially sectional view of a conventional ball screw of the tube type. In FIG. 3, a one-dot chained line A is a straight line which connects a central point $O_3$ of a ball 3a with an axial core center O of the ball screw. The central point $O_3$ of the ball 3a is presented at a ball scooping position where a ball 3 shifts from a loaded rolling portion formed within a raceway 6. Here, the loaded rolling portion means a portion where the balls rolled within the raceway in the loaded manner, are released from the located manner. Also, another one-dot chained line B is a straight line (a reference line) which is perpendicular to the rising direction of a tube 7 from the raceway 6 and passes through the axial core center O.

As shown in FIG. 3, in the conventional ball screw of the tube type, the ball scooping position is setted upwardly of the reference line B (that is, on the rising side of the tube 7). An angle θ of the ball scooping position with respect to the reference line B is setted at an angle in the range from 15° to 36°. Also, the tube is disposed in such a manner that an axis 71a of a rising portion 71 of the tube 7 coincides with a line 60a corresponding to a ball center locus 60 of the raceway 6.

On a screw shaft 1 side of the rising portion 71, there is disposed a tongue 72 which can be inserted into a ball rolling groove 4 of the screw shaft 1. Normally, the tongue 72 is projected downwardly of the end face of the tube 7 and thus the tongue 72 exists in the advancing direction of the ball 3. With this structure, the ball 3, which has reached at the ball scooping position, can be contacted with and picked up by the tongue 72. Then, the ball 3 is allowed to move through a space defined between the tongue 72 and a hole 21 formed in a nut 2, and can be then guided into the tube 7. The hole 21 is formed such that it continues with the inner surface of the rising portion 71 of the tube 7.

However, in the above-mentioned conventional ball screw of the tube type, there are following problems. That is, the advancing direction of the ball 3 is changed at a boundary point D between the ball rolling groove 5 of the nut 2 and hole 21 as well as at a leading end point E of the tongue 72. In this bout, noises, which are generated when the balls 3 pass through these points, become loud. Also, not only noises which are generated when the balls 3 moving toward the tube 7 are butted against the tongue 72, but also noises which are generated when the balls 3 are butted against the screw shaft 1 after the balls 3 have moved from the tube 7 to the raceway 6, are loud. Further, the collision of the balls 3 with the tongue 72 applies large stresses to the tongue 72 repeatedly and thus, especially when the ball screw is rotated at a high speed, there is a fear that the tongue 72 can be damaged or broken.

Therefore, in the conventional ball screw of the tube type, there is a need for reduction in the vibrations and noises thereof. As measures to deal with the large vibrations and noises, conventionally, there are employed a method of increasing the thickness of the tube and a method of increasing the strength of the tongue through a heat treatment. However, with use of these methods, the manufacturing cost of the ball screw becomes high.

SUMMARY OF THE PRESENT INVENTION

The present invention aims at eliminating the drawbacks found in the above-mentioned conventional ball screw of the tube type. Accordingly, it is an object of the present invention to provide a ball screw, which reduces the vibrations and noises effectively and also is manufactured at a low cost over the conventional ball screw.

In attaining the above object, according to the present invention, there is provided a ball screw, comprising: a screw shaft including a spiral-shaped ball rolling groove formed on an outer peripheral surface thereof; a nut including a spiral-shaped ball rolling groove which is corresponded to the spiral-shaped ball rolling groove formed on the screw shaft so as to form a raceway therebetween and is formed in an inner peripheral surface thereof; a plurality of balls respectively disposed within the raceway defined by the two spiral-shaped ball rolling grooves; and a tube for circulating the balls from one end side of the raceway to the other end side thereof and including rising portions which are disposed in a rising direction from the raceway, the tube being connected to the one end side of the raceway and the other end side thereof via the rising portions respectively; wherein an architectonic ball scooping position, where the balls are released from a loaded rolling portion formed in the raceway, is positioned on or in adjacent to a reference line, which is perpendicular to the rising direction of the rising portion and passing through an axial core point of the screw shaft, and wherein the tube is disposed in such a manner that the axis of the rising portion presents at a nut-side outside of a line corresponding to a ball center locus of the raceway in the diameter direction. in addition, the architectonic ball scooping position is also positioned downward of the reference line and positioned on the opposite side to the rising portion.

In the ball screw according to the present invention, preferably, the nut-side inner surface of the rising portion of the tube may be connected with the ball scooping position of the ball rolling groove of the nut by a surface existing outside of the ball rolling groove of the nut, that is, a surface existing outwardly in the diameter direction of the tube.

DETAILED DESCRIPTION OF THE PREFERRED EMBODIMENTS

Now, description will be given below of an embodiment of a ball screw according to the present invention.

Figure 1:
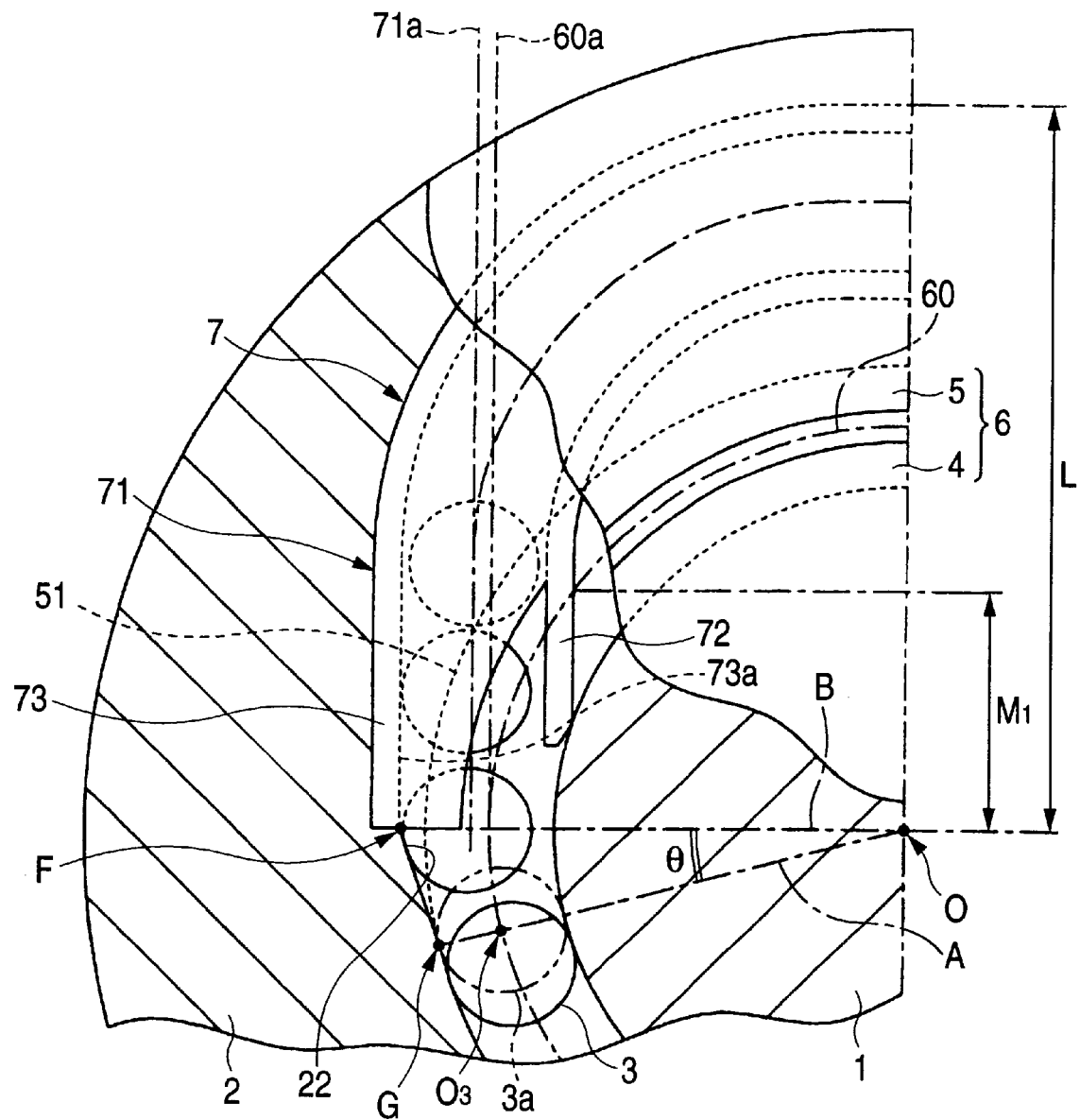
FIG. 1 is a partially sectional view of a ball screw according to an embodiment of the present invention.

FIG. 1 is a partially sectional view of a ball screw according to an embodiment of the present invention. In FIG. 1, the portions of the screw shaft and the nut, where a tube is installed, are formed by partially cutting a surface perpendicular to the axial direction of the ball screw.

The present ball screw includes a screw shaft 1, a nut 2, and a plurality of balls 3 disposed therebetween. In the outer peripheral surface of the screw shaft 1, there is formed a spiral-shaped ball rolling groove 4 and, in the inner peripheral a surface of the nut 2, there is formed a spiral-shaped ball rolling groove 5. The screw shaft exists within the nut 2. The ball rolling groove 4 of the screw shaft 1 and the ball rolling groove 5 of the nut 2 cooperate together and defines a raceway 6 within the nut 2. The balls 3 are allowed to roll along and within the raceway 6.

In FIG. 1, a one-dot chained line A is a straight line which connects the central point $O_3$ of a ball 3a presented at a ball scooping position to the axial center O of the ball screw 1. The ball scooping position defined a architectonic position where the ball 3 shifts from a loaded rolling portion formed within the raceway 6. Also, another one-dot chained line B is a straight line (a reference line) which is perpendicular to the rising direction of a tube 7 from the raceway 6 and passes through the axial core center O.

In the ball screw of the tube type according to the embodiment, the ball scooping position of the ball 3 is setted at a down side of the reference line B, that is, on the opposite side to the rising side of the tube 7. In addition, an angle θ of the ball scooping position with respect to the reference line B is setted at an angle of −15° (here, the mark [−] is used to mean "downwardly of the reference line B").

On the screw shaft 1 side of a rising portion 71 of the tube 7, there is disposed the tongue 72 which can be inserted into the ball rolling groove 4 of the screw shaft 1. On the nut 2 side of the rising portion 71 of the tube 7, there is formed a pickup portion 73 which projects more downwardly than the tongue 72. The tube 7 is disposed in such a manner that-not only the end face of the pickup portion 73 (the end face of the rising portion 71) can coincide with the reference line B, but also an axis 71a of the rising portion 71 is presented outside of a ling 60a corresponding to a ball center locus 60 of the raceway 6 (that is, it is presented on the nut side not on the screw shaft side)

Also, in the nut 2, there is formed a surface 22 which connects a position (a point F), where the end face of the pickup portion 73 of the tube 7 is disposed, with the ball scooping position (a point G) of the ball rolling groove 5 almost in a straight-line manner. This straight line is presented out side of a line 51 defining the bottom surface of the ball rolling groove 5 (that is, outwardly in the diameter direction of the nut). With this structure, the inner surface 73a of the pickup portion 73 of the tube 7 (that is, the nut-side inner surface 73a of the rising portion 71 of the tube 7) is connected to the ball scooping position of the ball rolling groove 5 of the nut 2 by the surface .(pickup surface) 22 of the nut 2. The surface 22 is presented out side of the ball rolling groove 5 of the nut 2 in the diameter direction of the nut 2.

Therefore, in the ball screw according to the embodiment, after the ball 3 rolled on the raceway 6 in a loaded manner and reached at the ball scooping position, the ball 3 rolls while it is pressed against the pickup surface 22 due to a centrifugal force and moves smoothly into the pickup portion 73 of the tube 7. Therefore, the ball 3 is prevented from colliding with the tongue 72. Also, since the axis 71a of the rising portion 71 of the tube 7 is setted out side of the line 60a corresponding to the ball center locus 60 of the raceway 6, the ball 3 is prevented from colliding with the shoulder portion of the ball rolling groove 4 of the screw shaft 1 in the vicinity of the tongue 72.

As a result of this, in the ball screw according to the embodiment, vibrations and noises can be reduced effectively without increasing the thickness of the tube or without enhancing the strength of the tongue through heat treatment. Further, since the ball 3 is hard to collide with the shoulder portion of the ball rolling groove 4 of the screw shaft 1, the lives of the ball 3 and screw shaft 1 con be enhanced. In addition, the tube can be formed of synthetic resin. In this case, the vibrations can be restricted further and the noises can be reduced further.

Figure 3:
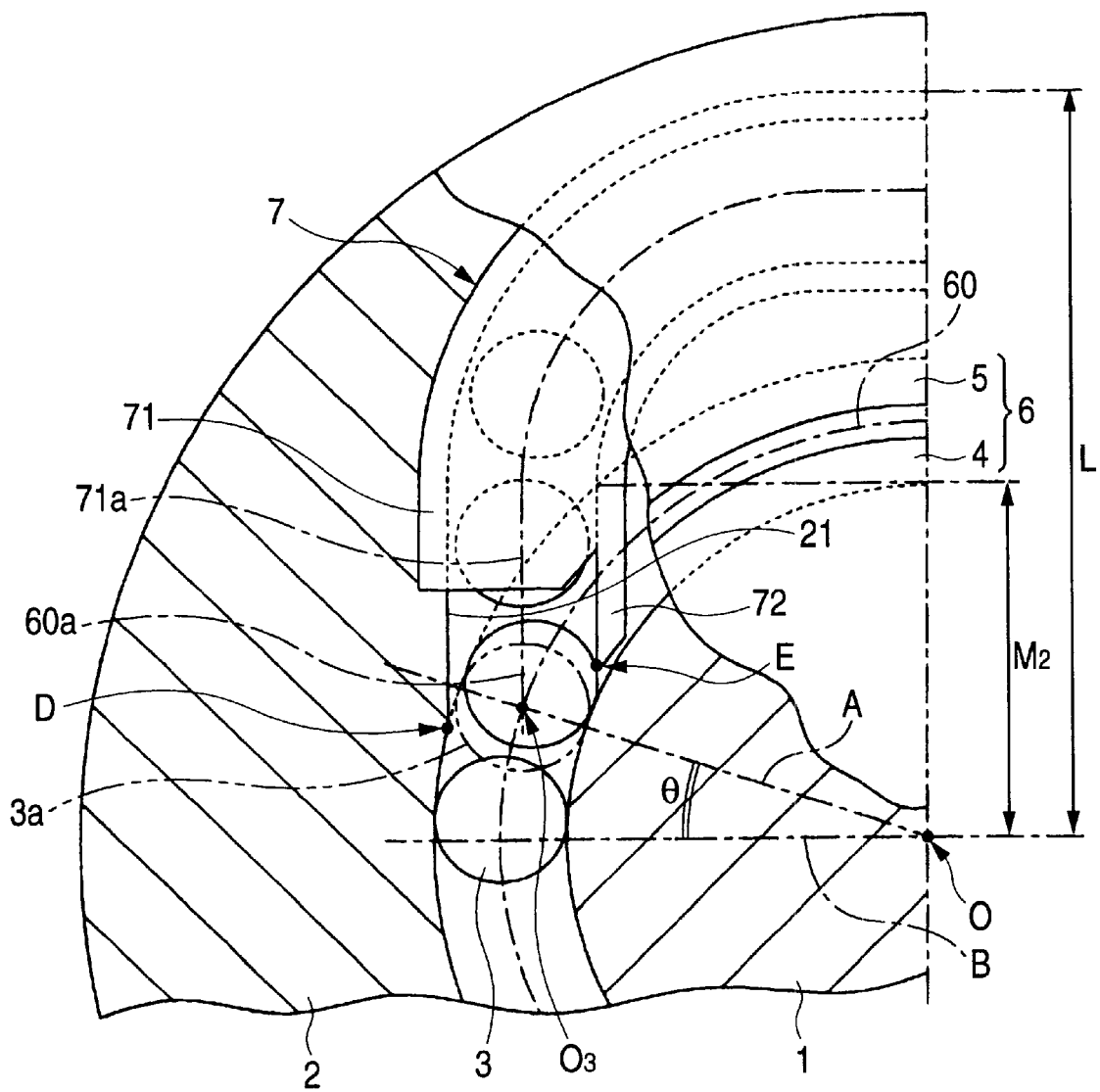

Also, since the end face of the pickup portion 73 of the tube 7 is disposed so as to coincide with the reference line B, the height M1 of the bending start point of the tube 7 from the axial core point O can be setted to be smaller-than the height (M2) shown in FIG. 3. Due to this, in case that the jump-out quantities L of the tube 7 from the axial core point O are setted equal to the conventional ball screw of the tube type chown in FIG. 3, the degree of the bending of the tube 7 can be made gentle, that is, the radius of curvature of the bent portion can be increased. Therefore, it makes possible for the balls 3 to move smoothly within the tube 7. As a result-of this, the noises can be reduced further and the operation efficiency can be enhanced further.

Figure 2:
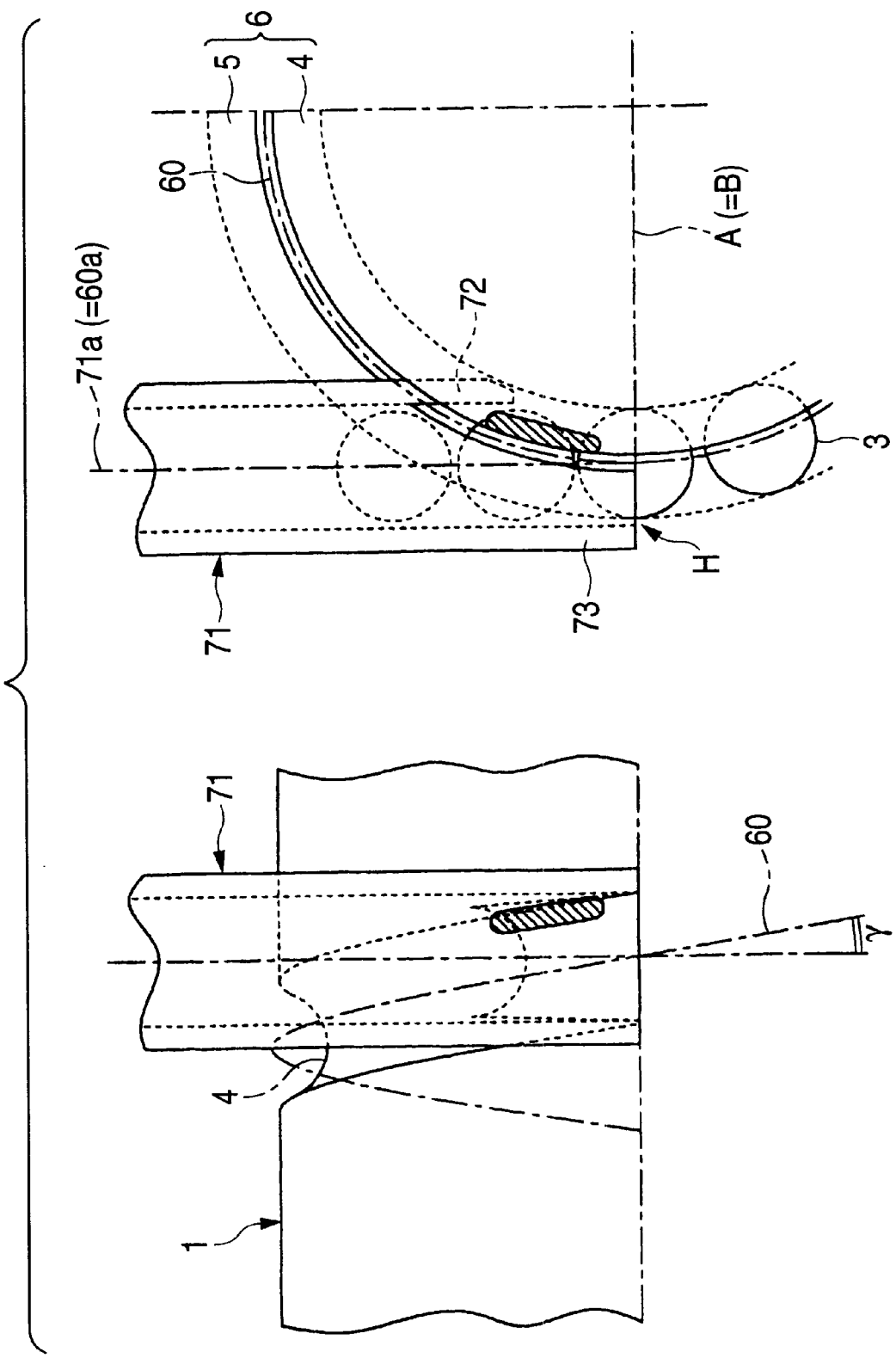
FIG. 2 is a partially sectional view of a ball screw according to a comparison example of the present invention; and, FIG. 3 is a partially sectional view of a conventional ball screw of a tube type.

On the other hand, as shown in FIG. 2, in case that the axis 71a of the rising portion 71 of the tube 7 coincides with the line 60a corresponding to the ball center locus 60 of the raceway 6, when a lead angle γ is large, especially in case that the ball scooping position of the ball 3 is made to coincide with the reference line B (that is, θ=0), the ball 3, in the vicinity of the tongue 72, is easy to collide with the shoulder portion (oblique line portion) of the ball rolling groove 4 of the screw shaft 1. For this reason, conventionally, as shown in FIG. 3, the ball scooping position of the ball 3 is setted so as to be present upwardly of the reference line B (θ is ranged from 15° to 36° ).

Also, in the case of the ball screw shown in FIG. 2, since the end face of the pickup portion 73 of the tube 7 coincides with the ball scooping position of the ball 3, the inside diameter of the tube 7 is slightly larger than the diameter of the ball 3. Thus, a step is easy to occur at a boundary position H between the ball rolling groove 5 of the nut 2 and the pickup portion 73 of the tube 7. Therefore, when compared with the ball screw shown in FIG. 1, the ball 3, which has reached at the ball scooping position, is hard to move into the pickup portion 73 of the tube 7. However, because the ball scooping position of the ball 3 is setted so as to coincide with the reference line B (θ=0), there can be avoided the possibility that the ball 3 collides with the tongue 72.

By the way, in the ball screw according to the embodiment (the ball screw shown in FIG. 1), the pickup surface 22 connects the inner surface 73a of the pickup portion 73 of the tube 7 with the ball scooping position of the ball rolling groove 5 of the nut 2 out side of the ball rolling groove 5 of the nut 2, and the pickup surface 22 is formed as a surface (a surface near to a plane) which connects together the points F and G almost linearly. However, preferably, this pickup surface 22 may be formed such that the step at these points can be minimized as much as possible. For this purpose, preferably, the pickup surface 22 may be formed in the following manner: that is, for example, from the point F. a surface is extended along the inner surface 73a of the pickup portion 73 of the tube 7; on the other hand, from the point G, a surface is extended along the tangential direction of the ball rolling groove 5 of the nut 2; and, these two surfaces are smoothly connected together by a smooth curved surface.

Also, in the ball screw according to the embodiment, the end face of the pickup portion 73 of the tube 7 is formed so as to coincide with the reference line B. However, this is not limitative but, in case where the position of the end face of the pickup portion 73 and the ball scooping position of the ball rolling groove 5 are connected together by a surface existing out side of the ball rolling groove 5 of the nut 2 (outwardly in the diameter direction of the nut), the position of the end face of the pickup portion 73 may not coincide with the reference line B (that is, it may exist upwardly of the reference line B).

Also, the ball screw, in which the axis 71a of the rising portion 71 of the tube 7 is setted outside of the line 60a corresponding to the ball center locus 60 of the raceway 6 and the ball scooping position of the ball 3 is setted to coincide with the reference line B (θ=0), that is, the ball screw, in which the axis 71a is setted outside of the line 60a in FIG. 2, falls within the scope of the present invention. According to this ball screw, there can be avoided the possibility that the ball 3, in the vicinity of the tongue 72, collides with the shoulder portion (the oblique line portion in FIG. 2) of the ball rolling groove 4 of the screw shaft 1.

Also, according to this ball screw, in case where the position in which the end face of the pickup portion 73 of the tube 7 and the ball scooping position of the ball rolling groove 5 are connected together by a surface existing outside of the ball rolling groove 5 of the nut 2 (a surface existing outwardly in the diameter direction of the nut), the end face position of the pickup portion 73 of the tube 7 may be set upwardly of the reference line B.

And, in the ball screw according to the embodiment, preferably, between the balls 3, there is interposed a spacer which includes a ball hold surface. The spacer can restrict the movements of the balls 3 and, therefore, up to the time just before the balls 3 move into the rising portion 71 of the tube 7 from its ball scooping position, the balls 3 can be prevented from moving in a zigzag manner: that is, the balls 3 are able to move more smoothly.

Also, in order to greatly reduce the vibrations and noises especially when the ball screw is rotated at a high speed, preferably, there may be used balls each made of ceramics and having a small specific gravity rather than balls made of iron and steel, because the ceramics-made balls can reduce the shock energy. In this case, much more preferably, between the balls made of ceramics, there may be interposed a spacer or a retainer which is composed of a combination of spacers.

As has been described heretofore, according to the present invention, there can be provided a ball screw which can reduce vibrations and noises greatly and also can be manufactured at a low cost.

What is claimed is:

1. A ball screw, comprising:

a screw shaft including a spiral-shaped ball rolling groove formed on an outer peripheral surface thereof;

a nut including a spiral-shaped ball rolling groove which is corresponded to said spiral-shaped ball rolling groove formed on said screw shaft so as to form a raceway therebetween and is formed in an inner peripheral surface thereof;

a plurality of balls respectively disposed within said raceway defined by said two spiral-shaped ball rolling grooves; and a tube for circulating said balls from one end side of said raceway to the other end side thereof and including rising portions which are disposed in a rising direction from said raceway, said tube being connected to said one end side of said raceway and the other end side thereof via said rising portions respectively;

wherein an architectonic ball scooping position, where said balls are released from a loaded rolling portion formed in said raceway, is positioned on or in adjacent to a reference line that is perpendicular to said rising direction of said rising portion and passing through an axial core point of said screw shaft; and wherein said tube is disposed in such a manner that the axis of said rising portion presents at a nut-side outside of a line corresponding to a ball center locus of said raceway in the diameter direction.

2. The ball screw as set forth in claim 1, wherein said architectonic ball scooping position is positioned downward of said reference line and positioned on the opposite side to said rising portion.

3. The ball screw as set forth in claim 1, wherein a nut-side inner surface of said rising portion is connected with a ball scooping position of said ball rolling groove of said nut by a surface existing outside of said ball rolling groove of said nut in the diameter direction of said tube.

4. The ball screw as set forth in claim 1, wherein said balls are each made from a material which has a specific gravity smaller than steel.

5. The ball screw as set forth in claim 4, wherein said material is ceramics.

6. The ball screw as set forth in claim 1, further comprising:

a spacer or a retainer interposed between said balls.

* * * * *